J. Harper.
Churn.
N° 88,474.  Patented Mar. 30, 1869.
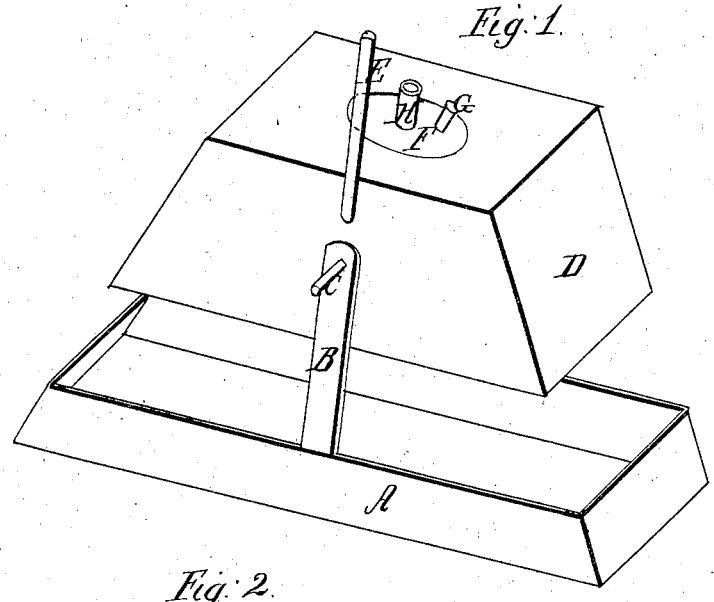
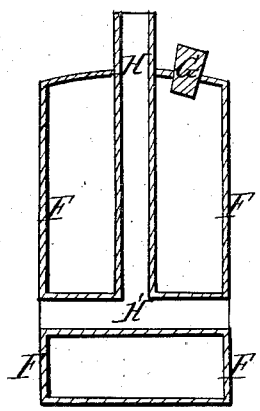
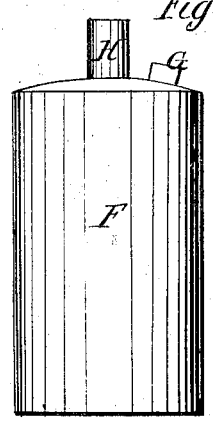
Witnesses;  Inventor;
John Harper

United States Patent Office.

JOHN HARPER, OF HILLSBOROUGH, IOWA.

Letters Patent No. 88,474, dated March 30, 1869.

---

IMPROVEMENT IN CHURNS.

---

The Schedule referred to in these Letters Patent and making part of the same.

---

*To all whom it may concern:*

Be it known that I, JOHN HARPER, of Hillsborough, in the county of Henry, and State of Iowa, have invented a new and useful Improvement in Churns; and I do hereby declare that the followng is a full, clear, and exact description of the same, reference being had to the annexed drawings, making part of this specification, in which—

Figure 1 is a perspective view of my improved churn, showing all the parts in position;

Figure 2 is a central vertical section of the water-reservoir and air-induction pipes; and Figure 3 is an elevation of the same.

Corresponding letters in each figure denote corresponding parts.

This invention relates to an improvement in churns; and

It consists in combining, with an oscillating churn, a reservoir for containing water for heating or cooling the milk or cream, as circumstances may require, said reservoir having passages formed within it, for the admission of air to the milk or cream, while the same is being churned.

A, in the drawings, represents a frame, which may be of any suitable construction, to form a base for the support of the churn.

B represents an upright, or standard, of which there are two which are firmly secured to the base, A, and rise therefrom for a distance sufficient to elevate the body of the churn to the desired height.

C represents a pivot, or journal, of which there are two, secured to the sides of the milk-vessel D, and which have their bearings in the standards B, they being so arranged that the vessel to which they are attached may oscillate freely thereon.

D represents a vessel for the reception of the cream or milk to be churned, which vessel may be rectangular in form, with bevelled ends, as shown in the drawings, or it may be constructed in other suitable form.

This vessel has formed in its upper surface, an aperture, for the reception of the water-vessel F, as will be more fully described hereafter, and it is provided with a handle, E, for oscillating the same, as clearly shown in fig. 1 of the drawings.

F represents a cylindrical vessel, which is to be of sufficient diameter to fill the aperture formed in the milk-vessel, and of a length sufficient to allow its lower end to rest upon the bottom of such vessel, while its upper end projects slightly above the upper surface thereof.

This vessel is provided with an aperture, which is formed in its upper end, as shown at G, which is for the purpose of allowing the same to be filled with warm or hot water, when the milk or cream needs warming or heating, or with cold water, when the same needs cooling, which operation is readily performed, as the vessel is not connected permanently with the milk-vessel, but may be removed therefrom at the pleasure of the operator.

H H' represent air-pipes, for the admission of air to the vessel D, while the process of churning is going on, the vertical pipe H serving to conduct the air to the horizontal one, H', through which it is conducted to the cream or milk in vessel D.

The operation of my improved churn is as follows:

The parts having been constructed and arranged as above described, the milk or cream is poured into vessel D, through the aperture formed in the top thereof, when the vessel F is to be inserted, which done, the churn is ready for use, and is to be oscillated by means of the handle E, which oscillations will cause the milk or cream to flow from one end of the vessel to the other, with sufficient rapidity of motion to cause that portion thereof which passes through the pipe H', and past the mouth of pipe H, to create a partial vacuum, and thus induce the influx of a current of air, which will aid in producing the change required in the contents of the churn, by causing additional agitation therein.

Should the operator discover, at any time, that the temperature of the contents of his churn needs to be changed, he will remove the stopper from the aperture G, and pour in warm or cold water, as the necessities of the case demand, when, by a further oscillation of vessel D, its contents will be brought into contact with vessel F, and thus the temperature thereof will be changed as desired.

Having thus described my invention,

What I claim, and desire to secure by Letters Patent, is—

1. A churn, in which the air that is admitted to the contents thereof, is caused to pass through a vessel containing hot or cold water, as circumstances may require, by which means said air is heated or cooled, as desired, substantially in the manner shown and described.

2. The construction of the vessel F, with its reservoir for water, and its air-passages, substantially as shown and described.

3. The combination and arrangement of vessels D and F, substantially as shown and described.

In testimony whereof, I have signed my name to this specification, in the presence of two subscribing witnesses.

JOHN HARPER.

Witnesses:
JOHN L. JORDAN,
HENRY McCOY.